United States Patent
Fang et al.

(10) Patent No.: US 9,346,945 B2
(45) Date of Patent: May 24, 2016

(54) FILLED SILICONE COMPOSITION, IN SITU PREPARATION AND USE THEREOF

(75) Inventors: Lei Fang, Shanghai (CN); Brian Harkness, Midland, MI (US); Xiucuo Li, Shanghai (CN); Lauren Tonge, Sanford, MI (US); James Tonge, Sanford, MI (US)

(73) Assignees: DOW CORNING CORPORATION, Midland, MI (US); DOW CORNING (CHINA) HOLDING CO., LTD., Shanghai (CN)

( * ) Notice: Subject to any disclaimer, the term of this patent is extended or adjusted under 35 U.S.C. 154(b) by 133 days.

(21) Appl. No.: 14/344,623

(22) PCT Filed: Oct. 11, 2011

(86) PCT No.: PCT/CN2011/080635
§ 371 (c)(1),
(2), (4) Date: Sep. 12, 2014

(87) PCT Pub. No.: WO2013/037148
PCT Pub. Date: Mar. 21, 2013

(65) Prior Publication Data
US 2015/0051345 A1    Feb. 19, 2015

(30) Foreign Application Priority Data
Sep. 13, 2011 (WO) ................ PCT/CN2011/079581

(51) Int. Cl.
| | | |
|---|---|---|
| C08K 9/06 | (2006.01) | |
| C08L 83/04 | (2006.01) | |
| C09D 183/04 | (2006.01) | |
| C09J 183/04 | (2006.01) | |
| C09D 183/14 | (2006.01) | |
| C08L 83/14 | (2006.01) | |
| C08K 3/36 | (2006.01) | |
| C08G 77/12 | (2006.01) | |
| C08G 77/20 | (2006.01) | |
| C08G 77/50 | (2006.01) | |

(52) U.S. Cl.
CPC . *C08K 9/06* (2013.01); *C08L 83/04* (2013.01); *C08L 83/14* (2013.01); *C09D 183/04* (2013.01); *C09D 183/14* (2013.01); *C09J 183/04* (2013.01); *C08G 77/12* (2013.01); *C08G 77/20* (2013.01); *C08G 77/50* (2013.01); *C08K 3/36* (2013.01)

(58) Field of Classification Search
CPC .......... C08G 77/20; C08G 77/12; C08K 3/36; C08K 9/06; C08L 83/00; C07F 7/18
See application file for complete search history.

(56) References Cited

U.S. PATENT DOCUMENTS

| | | |
|---|---|---|
| 3,159,601 A | 12/1964 | Ashby |
| 3,220,972 A | 11/1965 | Lamoreaux |
| 3,296,291 A | 1/1967 | Chalk et al. |
| 3,419,593 A | 12/1968 | Willing |
| 3,516,946 A | 6/1970 | Modic |
| 3,715,334 A | 2/1973 | Karstedt |
| 3,814,730 A | 6/1974 | Karstedt |
| 3,989,668 A | 11/1976 | Lee et al. |
| 4,766,176 A | 8/1988 | Lee et al. |
| 4,784,879 A | 11/1988 | Lee et al. |
| 4,962,076 A | 10/1990 | Chu et al. |
| 4,970,126 A * | 11/1990 | Adaniya ............. B05D 7/51 428/623 |
| 5,017,654 A | 5/1991 | Togashi et al. |
| 5,036,117 A | 7/1991 | Chung et al. |
| 5,051,455 A | 9/1991 | Chu et al. |
| 5,053,442 A | 10/1991 | Chu et al. |
| 5,175,325 A | 12/1992 | Brown et al. |
| 5,861,448 A | 1/1999 | Griffith et al. |
| 6,511,754 B1 | 1/2003 | Bohin et al. |
| 2008/0300358 A1 | 12/2008 | Cook et al. |
| 2009/0291238 A1 | 11/2009 | Scott et al. |
| 2012/0245272 A1* | 9/2012 | Dent ................. C08L 83/14 524/502 |

FOREIGN PATENT DOCUMENTS

| | | |
|---|---|---|
| CN | 1192456 A | 9/1998 |
| EP | 0 347 895 A2 | 12/1989 |
| WO | 2011 056832 | * 5/2011 |

OTHER PUBLICATIONS

International Search Report for Application No. PCT/CN2011/080635 dated Jun. 28, 2012, 2 pages.
English language abstract not found for CN 1192456; however, see English language equivalent U.S. Pat. No. 5,861,448. Original document extracted from espacenet.com database on Jun. 19, 2014, 14 pages.

* cited by examiner

*Primary Examiner* — Kuo-Liang Peng
(74) *Attorney, Agent, or Firm* — Howard & Howard Attorneys PLLC

(57) ABSTRACT

Filled silicone composition, in situ preparation and use thereof are provided. The composition comprises a mixture of (A) an in situ-prepared treated silica, (B) an in situ-prepared (siloxane-alkylene)-endblocked polydiorganosiloxane, (c) a cure catalyst and (D) a crosslinker. Moreover, the composition can be used as adhesive, coating and sealant.

15 Claims, 1 Drawing Sheet

FILLED SILICONE COMPOSITION, IN SITU PREPARATION AND USE THEREOF

CROSS-REFERENCE TO RELATED APPLICATIONS

This application is the National Stage of International Patent Application No. PCT/CN2011/080635, filed on Oct. 10, 2011, which claims priority to and all the advantages of International Patent Application No. PCT/CN2011/079581, filed on Sep. 13, 2011, the content of which is incorporated herein by reference.

STATEMENT REGARDING FEDERALLY SPONSORED RESEARCH

Not applicable.

This invention comprises filled silicone compositions, preparations and uses.

Silicone based adhesives, coatings, and sealants generally have been useful in a variety of adhering, coating, and sealing applications and adhered, coated, and sealed articles in industries such as automotive, glass, electronics, and building industries.

BRIEF SUMMARY OF THE INVENTION

First, this invention is a filled silicone composition comprising a mixture of ingredients (A), (B), (C), and (D): (A) an in situ-prepared treated silica; (B) an in situ-prepared (siloxane-alkylene)-endblocked polydiorganosiloxane (SAE Polymer); (C) a catalytically effective amount of a cure catalyst; and (D) a crosslinking effective amount of a crosslinker.

Second, this invention is a method of producing the composition, the method comprising: treating an untreated silica (ingredient (a1)) with a treating effective amount of a treating agent (ingredient (a2)) in presence of an alkenyl-endblocked polydiorganosiloxane (AE Polymer, ingredient (b1)) so as to produce a liquid silicone rubber master batch (LSR MB) comprising a mixture of the treated silica (ingredient A) and AE Polymer; converting the AE Polymer in the LSR MB with a converting effective amount of a SiH containing siloxane (ingredient (b2) and a catalytically effective amount of a hydrosilation catalyst (ingredient (b3)) so as to produce a SiH converted polymer master batch (SCP MB) comprising a mixture of the treated silica and SAE Polymer; and mixing the SCP MB with sufficient amounts of the cure catalyst (C) and crosslinker (D) so as to produce the composition.

Third, this invention is a cured material prepared by curing the composition.

Fourth, this invention is a manufactured article comprising a substrate and the composition or the cured material in operative contact therewith.

Each composition is curable and useful, inter alia, as an adhesive, coating or sealant.

BRIEF DESCRIPTION OF THE DRAWINGS

Some embodiments of the invention are described herein in relation to the accompanying drawings.

DETAILED DESCRIPTION OF THE INVENTION

Figure 1:
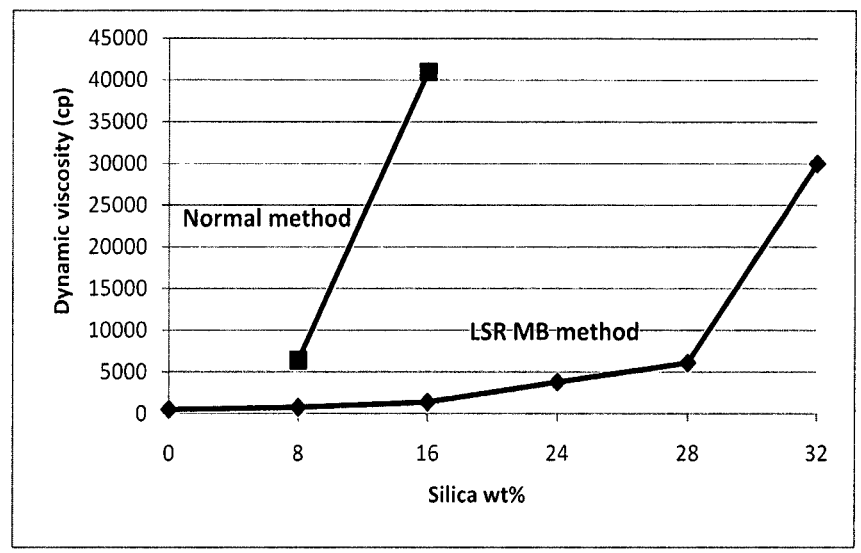
FIG. 1 graphically depicts change in dynamic viscosity versus wt % silica content for the compositions of the Examples prepared using the invention "LSR MB method" and for the formulations of the Comparative Examples prepared using the "Normal method."

The Brief Summary and Abstract are incorporated here by reference.

"May" confers a choice and is in no way an imperative. "2+" means at least two. "Optionally" means is absent, alternatively is present. The "contacting" comprises uniformly mixing together. The "operative contact" comprises effective touching, e.g., an adhering, coating, filling, or sealing. All "wt %" (weight percent) is, unless otherwise noted, based on total weight of all ingredients used to make the composition, which adds up to 100 wt %. "Treated" is non-covalent or covalent bonding, or any 2+ combination thereof. All viscosities are conducted at 25° C. unless otherwise noted. The "sufficient amount" means a quantity enough to result in the effective amount.

The inventors recognized problems with prior art silica filled silicone compositions, which without fluidizer rapidly gelled or had a dynamic viscosity-to-silica concentration of ≥500 cP at ambient temperature. This made them unsuitable for certain transferring or manufacturing unit operations, or applications requiring high silica loading, lower viscosities (i.e., higher flowability), higher cure speeds, ambient temperature curability, good repairability performance, or any 2+ combination thereof.

One of the problems solved by this invention is providing an alternative silica filled silicone composition and method of making same that may unpredictably achieve a relatively lower ratio of dynamic viscosity to concentration of treated silica at ambient temperature (e.g., 25° C.-27° C.). This ratio can vary with the treated silica concentration. The ratio may be characteristic (a): a ratio of dynamic viscosity to concentration of treated silica of from >0 to ≤200 centiPoise per weight percent (cP/wt %) for treated silica concentrations of from >0 wt % to 10 wt %, ≤500 cP/wt % for treated silica concentrations of from >10 wt % to 20 wt %, ≤1,000 cP/wt % for treated silica concentrations of from ≥20 wt % to 25 wt %, and ≤4,000 cP/wt % for treated silica concentrations of from >25 to 30 wt %, and ≤5,000 cP/wt % for treated silica concentrations of from >30 to 35 wt %; wherein the treated silica concentrations are based on total weight of the composition and dynamic viscosity is tested as described in ASTM D3236-88(2009) (*Standard Test Method for Apparent Viscosity of Hot Melt Adhesives and Coating Materials*). The characteristic (a) of the (invention) composition is unpredictably lower at a given concentration of treated filler in the composition than a reference ratio of dynamic viscosity relative to concentration of silica at a same treated filler concentration and temperature of a (non-invention) comparative formulation lacking the present in situ preparations. The SAE Polymer of the composition may be prepared in situ in the presence of ingredient (A). The comparative formulation may be prepared by the following (non-invention) method comprising: converting the AE Polymer in absence of filler (i.e., (un)treated silica) and treating agent with the SiH containing siloxane and hydrosilation catalyst so as to produce a filler-free SiH converted polymer master batch (FFSCP MB) comprising the SAE Polymer; and mixing the FFSCP MB with sufficient amounts of a hexamethyldisilazane pretreated silica micropowder, the cure catalyst and crosslinker so as to produce the comparative formulation, which has a concentration of pretreated filler that is the same as the concentration of treated filler in the (invention) composition. The silica before treatment can be, e.g., RDX200 fumed silica, Nippon Aerosil K.K., Japan). Unlike the comparative formulation, the (invention) composition may be one that can achieve characteristic (a) without needing a separate ingredient that is a fluidizer. The "fluidizer" is a viscosity-reducing additive, which is a substance distinct from ingredients (A) to (D) that has been added to, and not generated as a by-product in, the composition and that has a kinematic viscosity from >0 to ≤10,000 square centimeter per second ($cm^2/s$, wherein 1 $cm^2/s$=1 centistoke (cSt)), alternatively from >0 to ≤1,000 $cm^2/s$. The kinematic viscosity may be determined according to test method ASTM-D445-11a (*Standard Test Method for Kinematic Viscosity of Transparent and Opaque Liquids (and Calculation of Dynamic Viscosity)*), e.g., at 25° C.

Aspects of this invention may independently solve additional problems and have additional advantages. For example, the composition may be alternatively, or additionally, characterized by characteristic (b), (c), (d), (e), (f), or (g): (b): a hardness of >20, >24, >26, >30, or >35 Shore A, all when tested according to ASTM D2240-05(2010) (*Standard Test Method for Rubber Property Durometer Hardness*); (c): a tensile strength of >100 pounds per square inch (psi), >250 psi, >300 psi, >380 psi, >430 psi, or >450 psi, all when tested according to ASTM D412-06ae2 (*Standard Test Methods for Vulcanized Rubber and Thermoplastic Elastomers Tension*); (d): a tack-free time of <15 minutes, <9 minutes, <8 minutes, <6 minutes, or <5 minutes, all when tested according to ASTM D2377-00(2008) (*Standard Test Method for Tack Free Time of Caulking Compounds and Sealants*); (e): an elongation at break of >125%, >130%, >150%, or >155%, all when tested according to ASTM D412-06ae2; (f): a concentration of treated silica of from >0 wt % to 10 wt %, from >10 wt % to 20 wt %, from >20 wt % to 25 wt %, from >25 to 30 wt %, or from >30 to 35 wt %, wherein the treated silica concentrations are based on total weight of the composition; or (g): any 2+ combination of (a) to (f). The concentration of treated silica may be based on the weight of untreated silica used as a percent of total weight of the composition. Characteristic (g) may be, for example, at least (a) and (b); alternatively at least (a) and (c); alternatively at least (a) and (d); alternatively at least (a) and (e); alternatively at least (a) and (f); alternatively at least (a), (b), and (f); alternatively at least (a), (c), and (f); alternatively at least (a), (e), and (f); alternatively at least (a), (b), (d), and (f); alternatively at least (a), (c), (d), and (f); alternatively at least (a), (d), (e), and (f). For (f), the concentration of treated silica may be from >0 wt % to 10 wt %, alternatively from >10 wt % to 20 wt %, alternatively from >20 wt % to 25 wt %, alternatively from >25 to 30 wt %, alternatively from >30 to 35 wt %. For (a), the ratio of dynamic viscosity to concentration of treated silica may be based on any one of the immediately foregoing treated silica concentrations. Each of the (b) Shore A hardness, (c) tensile strength, (d) tack-free time, and (e) elongation at break independently may be any one of the aforementioned values thereof. The testing for characteristics (a) to (g) are conducted at 25° C. unless indicated otherwise by the ad rem ASTM method or a test method described later in or for the Examples.

The composition may further comprise at least one additional ingredient, e.g., at least one of ingredients (E) to (I), alternatively at least one of ingredients (E) to (I) and (W): (E) a moisture curable diorganosiloxane polymer; (F) a vehicle (e.g., up to 50 wt % of a solvent (e.g., octamethyltrisiloxane) or diluent); (G) a surface modifier such as (g1) an adhesion promoter or (g2) a release agent (e.g., up to 5 wt % of a phenyl-containing polysiloxane); (H) an optical brightener; and (I) a pigment; and (W) a corrosion inhibitor. The composition may further comprise at least one of ingredients (J) to (V): (J) a drying agent; (K) an extender, a plasticizer, or a combination thereof; (L) a non-silica filler such as (L1) a non-silica reinforcing filler, (L2) a non-silica extending filler, (L3) a non-silica conductive filler (e.g., electrically conductive, thermally conductive, or both); (M) a treating agent for the non-silica filler; (N) a biocide, such as (n1) a fungicide, (n2) an herbicide, (n3) a pesticide, or (n4) an antimicrobial; (O) a flame retardant; (P) a chain lengthener; (Q) a tackifying agent; (R) a nonreactive binder; (S) an anti-aging additive; (T) a water release agent (e.g., to trigger moisture curing of the composition); (U) a rheological additive; and (V) a combination thereof (e.g., a combination of any two or more of ingredients (E) to (W)). In some embodiments at least one, alternatively each of additional ingredients (E) to (V) and (W) does not completely prevent the condensation reaction curing of the composition. The additional ingredients (E) to (V) and (W) are optional, are each independently present in or absent from the composition, and are distinct from one another and from ingredients (A) to (D) and are generally known in the art to be compatible with condensation curing of silicone compositions. When at least one of ingredients (E) to (V) and (W) (e.g., (I), (J) or (L) or (W)) is present, the composition may, alternatively may not, satisfy characteristic (a). There may be overlap between types or functions of ingredients because certain ingredients described herein may have more than one function. The amounts of ingredients (E) to (V) and (W) may be varied under the circumstances, and typically may be from 1 to 20 wt % of the relevant composition.

The composition may further contain unreacted residual amounts of one or more of ingredients (a1), (a2), and (b1) to (b3) as long as they do not eliminate the novel and inventive characteristics of this invention, although typically the sum of such residual amounts is <5 wt %, alternatively <2 wt %, alternatively <1 wt %, alternatively <0.5 wt %, alternatively 0 wt % of the composition. The SCP MB typically comprises a mixture of the treated silica (ingredient (A)) and SAE Polymer (ingredient (B)) in a wt/wt ratio of from 40/60 to 10/90, alternatively from 30/70 to 10/90, alternatively from 40/60 to 20/80, alternatively any combination thereof. The SCP MB typically is in the composition at a concentration of from 25 to 99.7 wt %, alternatively from 25 to 97 wt %, alternatively from 25 to 90 wt %, alternatively from 25 to 85 wt %, alternatively from 31 to 85 wt %, alternatively from 25 to 79 wt %, alternatively any combination thereof. For example, the lower limit of the concentration of SCP MB in the composition may be ≥30 wt %, alternatively ≥40 wt %, alternatively ≥50 wt %, alternatively ≥60 wt %; alternatively ≥70 wt %, alternatively ≥80 wt %, alternatively ≥90 wt %; and the upper limit of the concentration of SCP MB in the composition may be ≤99 wt %, alternatively ≤98 wt %, alternatively ≤97 wt %, alternatively ≤95 wt %, alternatively ≤90 wt %, alternatively ≤80 wt %, alternatively ≤70 wt %. The mixture may be non-uniform, alternatively uniform (i.e., thoroughly admixed).

Ingredient (A), the treated silica, is prepared in situ from the ingredients (a1) and (a2) in presence of at least a majority of the AE Polymer. Water may be used as a vehicle in the treating step. The amount of ingredient (a1) used relative to the amount of ingredient (a2) used may be from 7/1 to 3/1, alternatively from 6/1 to 3/1, alternatively from 7/1 to 4/1, alternatively any combination thereof, all based on wt/wt. Ingredients (a1) and (a2) are mixed together under high shear mixing conditions to give the LSR MB as a mixture of ingredient (A) and the AE Polymer. The resulting mixture may then be heated under a vacuum (e.g., of from −0.01 to −0.1 megaPascals (MPa)) and at a devolatilization temperature (e.g., of from 120° C. to 200° C.) sufficient for removing volatiles (e.g., methanol, trimethylsilanol, water, and the like) to give a devolatilized form of the LSR MB. The removing may comprise stripping of the volatiles for from 30 minutes to 3 hours. The devolatilized form of the LSR MB may be cooled to 25° C. if desired. If desired an additional amount of AE Polymer may be added to the LSR MB before the AE Polymer is converted with ingredients (b2) and (b3) to give ingredient (B) and the SCP MB.

Ingredient (a1), the untreated silica, may be a particulate silicon dioxide compound having a surface area of from 50 square meters per gram ($m^2/g$) to 600 $m^2/g$, alternatively in this range a maximum ≤400 $m^2/g$, alternatively ≤200 $m^2/g$; and alternatively in this range a minimum ≥80 $m^2/g$, alternatively ≥100 $m^2/g$. The untreated silica may be in an anhydrous form, alternatively a hydrous form having some free water (typically ≤4 wt %) reversibly adsorbed thereon, alternatively a combination thereof. Free water content of the untreated silica may be determined according to ASTM-D280-01 (2007) (*Standard Test Methods for Hygroscopic Moisture (and Other Matter Volatile Under the Test Conditions) in Pigments*) using a commercial gravimetric moisture analyzer, wherein generally the untreated silica is heated up to 110° C. until weight loss stabilizes and a weight difference is calculated that is used to determine amount of free water lost from the untreated silica. The form of the untreated silica may be a fumed silica (also known as pyrogenic silica), alternatively silica aerogel, alternatively silica xerogel, alternatively precipitated silica. Suitable untreated silicas are known in the art and commercially available; e.g., CAB-O-SIL fumed silica by Cabot Corporation of Massachusetts, U.S.A. The amount of ingredient (a1) may vary depending on factors such as the particular loading level (wt %) of treated filler desired in the composition and the surface area and amount of untreated silica particulates to be treated. Ingredient (a1) may be used in an amount ranging from 10 wt % to 60 wt %, alternatively 15 wt % to 50 wt %, and alternatively 20 wt % to 40 wt %, based on the weights of the untreated silica and composition.

Ingredient (a2), the treating agent, is useful for treating the filler. The treating agent may comprise a hexahydrocarbyldisilazane, alkenyl-functional silane, alkoxysilane, alkoxy-functional oligosiloxane, cyclic polyorganosiloxane, hydroxyl-functional oligosiloxane, fatty acid, organochlorosilane, organosiloxane, organodisilazane, organoalkoxysilane, titanate, titanate coupling agent, zirconate coupling agent, or any combination of at least two thereof. The fatty acid may be a stearate (e.g., calcium stearate). The alkenyl-functional silane may be ($C_2$-$C_4$)alkenyl tri(ketoximino)silane, tetra(ketoximino)silane, alkyltri(ketoximino)silane, alkyltri(alkyllactate)silane, ($C_2$-$C_4$)alkenyl tri(alkyllactate)silane, tetra(alkyllactate)silane, or a mixture of any two or more thereof; wherein each ketoximino is based on a dimethylketone, methyl ethyl ketone, or diethylketone. The ($C_2$-$C_4$)alkenyl may be 4-butenyl, 1-butenyl, allyl, or vinyl; alternatively allyl; alternatively vinyl. The alkoxysilane may be hexyltrimethoxysilane, octyltriethoxysilane, decyltrimethoxysilane, dodecyltrimethoxysilane, tetradecyltrimethoxysilane, phenylethyltrimethoxysilane, octadecyltrimethoxysilane, octadecyltriethoxysilane, or any combination of at least two thereof. The alkoxy-functional oligosiloxane may be (($C_1$-$C_7$)alkylO)$_q$Si(OSi(($C_1$-$C_7$)hydrocarbyl)$_2$($C_{10}$-$C_{17}$)hydrocarbyl)$_{(4-q)}$, wherein q is 1, 2 or 3, alternatively subscript q is 3, alternatively ($CH_3O$)$_3$Si(OSi($CH_3$)$_2$(dodecyl). The hydroxyl-functional oligosiloxane may be dimethyl siloxane or methyl phenyl siloxane. The organoalkoxysilane may be $C_6H_{13}Si(OCH_3)_3$, $C_8H_{17}Si(OC_2H_5)_3$, $C_{10}H_{21}Si(OCH_3)_3$, $C_{12}H_{25}Si(OCH_3)_3$, $C_{14}H_{29}Si(OC_2H_5)_3$, and $C_6H_5CH_2CH_2Si(OCH_3)_3$. The organochlorosilane may be methyltrichlorosilane, diethyldichlorosilane, or trimethylchlorosilane. The hexahydrocarbyldisilazane may be of formula (HDZ1): [($R^1$)$_3$Si]$_2$NH (HDZ1), wherein each $R^1$ independently is ($C_1$-$C_7$)hydrocarbyl or ($C_1$-$C_7$) heterohydrocarbyl. Each $R^1$ independently is unsubstituted or substituted with fluoro. Each unsubstituted ($C_1$-$C_7$)hydrocarbyl may be an unsubstituted ($C_1$-$C_7$)alkyl, unsubstituted ($C_2$-$C_7$)alkenyl (e.g., vinyl or allyl), unsubstituted ($C_3$-$C_7$)cycloalkyl (e.g., cyclopropyl), unsubstituted phenyl, or unsubstituted benzyl. The hexahydrocarbyldisilazane may be a hexaalkyl disilazane, wherein in (HDZ1) each $R^1$ may be ($C_1$-$C_7$)alkyl, e.g., hexamethyldisilazane ([($CH_3$)$_3$Si]$_2$NH).

The treating effective amount of ingredient (a2) is any quantity sufficient for preparing the treated silica, and the composition. The particular quantity may vary depending on factors such as the particular treating agent selected and the surface area and amount of untreated silica particulates to be treated. The treating effective amount may range from 0.01 wt % to 20 wt %, alternatively 0.1 wt % to 15 wt %, and alternatively 0.5 wt % to 5 wt %, based on the weight of the composition.

Ingredient (B) is prepared in situ from the ingredients (b1) to (b3). The alkenyls of the AE Polymer have a carbon-carbon double bond (C=C) that is converted by the SiH of the SiH containing siloxane to a Si—C(H)—C(H) moiety of the siloxane-alkylene of the SAE Polymer. It is unpredictable that the C=C may be converted by the SiH to the Si—C(H)—C(H) of the siloxane-alkylene of the SAE Polymer in presence of the in situ-prepared treated silica.

The amounts of ingredients (b1) to (b3) used may be from 40 wt % to 90 wt %, 1 wt % to 10 wt %, 0.01 wt % to 0.3 wt %, respectively, based on weight of the composition. Ingredients (b1) to (b3) may, alternatively, may not be mixed together under high shear mixing conditions so as to prepare ingredient (B) and the SCP MB.

Ingredient (b1), the AE Polymer, may be unblended or a blend of two or more different AE Polymers. The AE Polymer may have a dynamic viscosity of from 100 to 100,000 milli-Pascal-seconds (mPa·s) when tested as described in ASTM D1084-08 (*Standard Test Methods for Viscosity of Adhesives*). The AE Polymer may comprise, alternatively consist of, a molecule, alternatively a mixture of a plurality of molecules, of formula (AE1): ($C_2$-$C_4$)alkenyl-Si(R)$_2$-A-Si(R)$_2$—($C_2$-$C_4$)alkenyl. Each molecule may be the same or different as another one. The A group is a divalent moiety and may be acyclic; alternatively cyclic; alternatively acyclic and branched; alternatively acyclic and linear (straight chain). The A may be —O—[Si(R)$_2$—O]— wherein each R independently is organo. Each organo independently may be a hydrocarbyl or heterohydrocarbyl, alternatively each organo may be hydrocarbyl, alternatively unsubstituted hydrocarbyl. For example, the A may be a polydi($C_1$-$C_7$)hydrocarbyl)siloxane wherein each ($C_1$-$C_7$)hydrocarbyl independently is same or different. The polydi($C_1$-$C_7$)hydrocarbyl)siloxane may be a difunctional (D)siloxane unit represented as $R_2SiO_{2/2}$, wherein each R independently is the ($C_1$-$C_7$)hydrocarbyl. At least one, alternatively each organo (i.e., one or more of the hydrocarbyl or heterohydrocarbyl groups) of the R of the polydiorganosiloxane may be unsubstituted, alternatively substituted. The substituted organo may contain a substituent that is fluoro (e.g., fluoromethyl or fluorophenyl) or a moiety containing a heteroatom O, N, or S (e.g., —N(R*)$_2$, —OR*, —C(O)R*, —CO$_2$R*, or —SO$_2$R*, wherein each R* independently is H or ($C_1$-$C_3$)alkyl. Alternatively, each organo may be unsubstituted. Each unsubstituted organo independently may be an unsubstituted ($C_1$-$C_7$)alkyl, unsubstituted (C$_2$-C$_7$)alkenyl (e.g., vinyl or allyl), unsubstituted (C$_3$-C$_7$)cycloalkyl (e.g., cyclopropyl), unsubstituted phenyl, or unsubstituted benzyl. The polydi(C$_1$-C$_7$)hydrocarbyl)siloxane may be a polydi(C$_1$-C$_7$)alkylsiloxane, alternatively a polydi((C$_5$-C$_7$)alkyl)siloxane, alternatively a polydi(C$_1$-C$_4$) alkylsiloxane, alternatively a polydi((C$_1$-C$_3$)alkyl)siloxane, alternatively a polydi((C$_1$-C$_2$)alkyl)siloxane, alternatively a polydiethylsiloxane, alternatively a poly(ethyl,methyl)siloxane, alternatively a polydimethylsiloxane. The polydiorganosiloxane may, alternatively may not, have ≤5 wt %, alternatively ≤1 wt % T, Q, or T and Q units as long as the T and/or Q units do not eliminate the novel and inventive characteristics of this invention. The T unit is a trifunctional unit, RSiO$_{3/2}$, and may enable formation of a branched linear siloxane form of the composition. The Q unit is a tetrafunctional unit, SiO$_{4/2}$, and may enable formation of a crosslinked form of the composition. Each (C$_2$-C$_4$)alkenyl may be the same or different as another one. Each (C$_2$-C$_4$)alkenyl independently may be (C$_4$)alkenyl (e.g., 1-buten-1-yl or 1-buten-4-yl), alternatively (C$_3$)alkenyl (e.g., propen-1-yl or propen-3-yl), alternatively (C$_2$)alkenyl (i.e., vinyl, CH$_2$=CH—). The AE Polymer may be a vinyl-endcapped polydiorganosiloxane, alternatively a vinyl-endcapped polydimethylsiloxane of formula (VE1): CH$_2$=CH—Si(CH$_3$)$_2$O—[Si(CH$_3$)$_2$O]$_n$—Si(CH$_3$)$_2$—CH=CH$_2$ (VE1), wherein n is an average number of from 100 to 1000, and a dynamic viscosity of from 100 to 100,000 mPa·s when tested as described in ASTM D1084 Typically, n is 160, from 300 to 400, from 600 to 800, or from 800 to 1000.

The AE Polymer may be prepared by methods known in the art, such as condensation of an endcapping effective amount (e.g., 2 mole equivalents) of a corresponding alkenyldiorganohalosilane (e.g., vinyldimethylchlorosilane, i.e., CH$_2$=CH—Si(CH$_3$)$_2$—Cl) with a hydroxyl-endcapped polydiorganosiloxane (HOE Polymer) of formula H—O—[Si(R)$_2$—O]—H, wherein R is as defined for A. The endcapping effective amount may be readily determined based on number average molecular weights (M$_n$) of the HOE Polymer, with M$_n$ determined by gel permeation chromatography. Progress of the endcapping reaction may be monitored if desired by nuclear magnetic resonance (NMR) spectroscopy (e.g., $^1$H-NMR or $^{13}$C-NMR), Fourier transform-infrared spectroscopy (FT-IR), or titration of hydroxyls with iodine monochloride. The HOE Polymer may be prepared by methods known in the art, such as hydrolysis and condensation of the corresponding dialkylhalosilanes or equilibration of cyclic polydiorganosiloxanes (e.g., cyclic polydialkylsiloxanes). Alternatively, the HOE Polymer may be prepared by a preliminary hydrolysis of a hydrolyzable organic group-endcapped hydroxyl-endblocked polydiorganosiloxane, wherein the hydrolyzable organic group is cleaved by a minimal amount of moisture (water) effective therefor. Suitable HOE Polymers are known in the art and are commercially available (e.g., from Dow Corning Corporation, Midland, Mich., USA; or Gelest, Inc., Morrisville, Pa., USA).

Ingredient (b2), the SiH containing siloxane, may be represented by the formula M'DM', where M' is a siloxane unit of formula R$^c_2$HSiO$_{1/2}$, and D is a siloxane unit of formula R$^c_2$SiO$_{2/2}$, where each Re independently is a hydrogen or hydrocarbyl, which is as defined previously. At least one, alternatively each R$^c$ may be hydrocarbyl. Typically, the SiH terminated organopolysiloxane is a dimethylhydrogensiloxy-terminated polydimethylsiloxane having the average formula Me$_2$HSiO(Me$_2$SiO)$_x$SiHMe$_2$, where x is ≥0, alternatively x may range from 2 to 100, or from 2 to 50 and Me is methyl. The SiH containing siloxane may be of formula (SH1): ((C$_1$-C$_3$)alkoxy)$_3$Si(C$_1$-C$_4$alkylene)Si(R$^c$)$_2$OSi(R$^c$)$_2$H (SH1), wherein each R$^c$ independently is (C$_1$-C$_3$)alkyl. An example is (CH$_3$O)$_3$SiCH$_2$CH$_2$Si(CH$_3$)$_2$OSi(CH$_3$)$_2$H. The SiH containing siloxanes and methods for their preparation are well known in the art.

The converting effective amount of the SiH containing siloxane is any quantity effective for converting the SAE Polymer, and the composition. The quantity typically may be from 1.8 mole to 2.2 mole equivalent of SiH groups per mole of AE Polymer (i.e., from 0.9 to 1.1 mole equivalent of SiH groups per mole of the alkenyl groups of the AE Polymer. Progress of the converting reaction may be monitored by NMR or IR if desired. The composition includes embodiments wherein not all of the alkenyl groups of the AE Polymer have been converted to give the SAE Polymer.

Ingredient (b3), the hydrosilation catalyst, is exemplified and described in U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are exemplified in U.S. Pat. Nos. 4,766,176 and 5,017,654. The hydrosilation catalyst may be a platinum-based hydrosilation catalyst, e.g., platinum divinyl tetramethyl disiloxane complex typically containing one weight percent of platinum in a solvent such as toluene, which is described in U.S. Pat. Nos. 3,715,334 and 3,814,730. Another suitable platinum catalyst is a reaction product of chloroplatinic acid and an organosilicon compound containing terminal aliphatic unsaturation as described in U.S. Pat. No. 3,419,593. Another suitable platinum catalyst is a neutralized complex of platinous chloride and divinyl tetramethyl disiloxane, for example as described in U.S. Pat. No. 5,175,325. Another example is Pt[CH$_2$=CH—Si(CH$_3$)$_2$—O—Si(CH$_3$)$_2$—CH=CH$_2$]$_y$, wherein y is 1 or 2. The hydrosilation catalyst may be used in an amount of from 0.00001 to 5 wt %, based on the amount of ingredient (b2) used. For example, the hydrosilation catalyst may be used in an amount sufficient to provide 0.1-15 parts per million (ppm) Pt metal per total weight of the SCP MB.

The hydrosilylation reaction to prepare ingredient (B), and the SCP MB, may be conducted neat or in the presence of a solvent. The solvent may be an alcohol such as methanol, ethanol, isopropanol, butanol, or n-propanol, a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride, chloroform, dimethyl sulfoxide, dimethyl formamide, acetonitrile, tetrahydrofuran, white spirits, mineral spirits, or naphtha. If desired, the solvent and any volatile by-products (e.g., ammonia) may be removed (e.g., by stripping under vacuum at ambient or elevated temperature) after the hydrosilation reaction is complete and before ingredients (C) and (D) are contacted with the SCP MB.

Ingredient (C) is the cure catalyst. The cure catalyst may be any suitable substance that is effective for promoting crosslinking (e.g., increasing cure speed or shortening tack-free time) of the composition. The cure catalyst can be employed in the composition in any suitable catalytically effective amount, which may be from ≥0.1 to 5 wt %, alternatively in this range a minimum ≥0.20 wt %, alternatively ≥0.30 wt %, alternatively ≥0.50 wt %; and alternatively in this range a maximum ≤4 wt %, alternatively ≤3 wt %, alternatively ≤2 wt %, alternatively ≤1 wt %; alternatively any combination thereof. The cure catalyst may comprise ammonia, a carboxylic acid salt of a metal, a tin compound, a titanium compound, or a zirconium compound. The metal of the carboxylic acid salt may be any one from lead to manganese inclusive, in the electromotive series of metals. Alternatively, ingredient (C) may comprise a chelated titanium compound, a titanate such as a tetraalkoxytitanate, tetrabutyl titanate, isopropylacetylacetonatotitanate, or a combination thereof. Ingredient (C) may comprise a tin compound such as dimethyltin dineodecanoate, dibutyltin diacetate, dibutyltin dilaurate, dibutyl tin oxide, stannous octanoate tin oxide, or any 2+ combination thereof. Examples of suitable catalysts are disclosed in U.S. Pat. Nos. 4,962,076; 5,051,455; and 5,053,442. Suitable cure catalysts are commercially available (e.g., from Sigma-Aldrich Company, St. Louis, Mo.; Momentive, Columbus, Ohio; or Gelest, Inc., Morrisville, Pa., all of USA) or can be readily prepared by methods known in the art.

Ingredient (D), the crosslinker, generally is selected with functionality that may vary depending on the degree of crosslinking desired in the curing reaction product of the composition and may be chosen such that the reaction product does not exhibit too much weight loss from by-products of the condensation reaction. Generally, the selection of ingredient (D) is made such that the composition remains sufficiently reactable to be useful during storage for several months in a moisture impermeable package. The exact amount of ingredient (D) may vary depending on factors including the average Mn of the SAE Polymer, the particular crosslinker selected, the reactivity of the hydrolyzable substituents on the SAE Polymer and crosslinker, the absence, alternatively presence and quantity, of ingredient (E), and the desired crosslink density of the reaction product. The crosslinker can be employed in the composition in any suitable crosslinking effective amount, which may range from 0.2 to 10 wt %, alternatively 0.5 to 5 wt % based on weight of ingredient (B).

Ingredient (D) may comprise a silane crosslinker having hydrolyzable groups or partial or full hydrolysis products thereof. Ingredient (D) has an average, per molecule, of greater than two substituents reactive with the hydrolyzable substituents on ingredient (B). Examples of suitable silane crosslinkers for ingredient (D) may have the general formula (III) $R^8_k Si(R^9)_{(4-k)}$, where each $R^8$ is independently a monovalent hydrocarbon group such as an alkyl group; each $R^9$ is a hydrolyzable substituent, which may be the same as X described above for ingredient (B). Alternatively, each $R^9$ may be, for example, a halogen atom, an acetamido group, an acyloxy group such as acetoxy, an alkoxy group, an amido group, an amino group, an aminoxy group, a hydroxyl group, an oximo group, a ketoximo group, or a methylacetamido group; and each instance of subscript k may be 0, 1, 2, or 3. For ingredient (D), subscript k has an average value greater than 2. Alternatively, subscript k may have a value ranging from 3 to 4. Alternatively, each $R^9$ may be independently selected from hydroxyl, alkoxy, acetoxy, amide, or oxime. Alternatively, ingredient (C) may be selected from an acyloxysilane, an alkoxysilane, a ketoximosilane, and an oximosilane.

Ingredient (D) may comprise an alkoxysilane exemplified by a dialkoxysilane, such as a dialkyldialkoxysilane (e.g., dimethoxydimethylsilane); a trialkoxysilane, such as an alkyltrialkoxysilane; a tetraalkoxysilane; or partial or full hydrolysis products thereof, or another combination thereof. Examples of suitable trialkoxy-containing silanes include methyltrimethoxysilane, methyltriethoxysilane, ethyltrimethoxysilane, ethyltriethoxysilane, isobutyltrimethoxysilane, isobutyltriethoxysilane, and a combination thereof, and alternatively methyltrimethoxysilane. Examples of suitable tetraalkoxysilanes include tetraethoxysilane. The amount of the alkoxysilane that is used in the curable silicone composition may range from 0.5 to 15, parts by weight per 100 parts by weight of ingredient (B).

Ingredient (D) may comprise an acyloxysilane, such as an acetoxysilane. Acetoxysilanes include a tetraacetoxysilane, an organotriacetoxysilane, a diorganodiacetoxysilane, or a combination thereof. The acetoxysilane may contain alkyl groups such as methyl, ethyl, propyl, isopropyl, butyl, and tertiary butyl; alkenyl groups such as vinyl, allyl, or hexenyl; aryl groups such as phenyl, tolyl, or xylyl; aralkyl groups such as benzyl or 2-phenylethyl; and fluorinated alkyl groups such as 3,3,3-trifluoropropyl. Exemplary acetoxysilanes include, but are not limited to, tetraacetoxysilane, methyltriacetoxysilane, ethyltriacetoxysilane, vinyltriacetoxysilane, propyltriacetoxysilane, butyltriacetoxysilane, phenyltriacetoxysilane, octyltriacetoxysilane, dimethyldiacetoxysilane, phenylmethyldiacetoxysilane, vinylmethyldiacetoxysilane, diphenyldiacetoxysilane, tetraacetoxysilane, and combinations thereof. Alternatively, ingredient (D) may comprise organotriacetoxysilanes, for example mixtures comprising methyltriacetoxysilane and ethyltriacetoxysilane. The amount of the acetoxysilane that is used in the curable silicone composition may range from 0.5 to 15 parts by weight per 100 parts by weight of ingredient (B); alternatively 3 to 10 parts by weight of acetoxysilane per 100 parts by weight of ingredient (B).

Examples of silanes suitable for ingredient (D) containing both alkoxy and acetoxy groups that may be used in the composition include methyldiacetoxymethoxysilane, methylacetoxydimethoxysilane, vinyldiacetoxymethoxysilane, vinylacetoxydimethoxysilane, methyldiacetoxyethoxysilane, metylacetoxydiethoxysilane, and combinations thereof.

Aminofunctional alkoxysilanes suitable for ingredient (D) are exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and a combination thereof.

Suitable oximosilanes for ingredient (D) include alkyltrioximosilanes such as methyltrioximosilane, ethyltrioximosilane, propyltrioximosilane, and butyltrioximosilane; alkoxytrioximosilanes such as methoxytrioximosilane, ethoxytrioximosilane, and propoxytrioximosilane; or alkenyltrioximosilanes such as propenyltrioximosilane or butenyltrioximosilane; alkenyloximosilanes such as vinyloximosilane; alkenyl alkyldioximosilanes such as vinyl methyldioximosilane, vinyl ethyldioximosilane, vinyl methyldioximosilane, or vinyl ethyldioximosilane; or combinations thereof.

Suitable ketoximosilanes for ingredient (D) include methyl tris(dimethylketoximo)silane, methyl tris(methylethylketoximo)silane, methyl tris(methylpropylketoximo)silane, methyl tris(methylisobutylketoximo)silane, ethyl tris(dimethylketoximo)silane, ethyl tris(methylethylketoximo)silane, ethyl tris(methylpropylketoximo)silane, ethyl tris(methylisobutylketoximo)silane, vinyl tris(dimethylketoximo)silane, vinyl tris(methylethylketoximo)silane, vinyl tris(methylpropylketoximo)silane, vinyl tris(methylisobutylketoximo)silane, tetrakis(dimethylketoximo)silane, tetrakis(methylethylketoximo)silane, tetrakis(methylpropylketoximo)silane, tetrakis(methylisobutylketoximo)silane, methylbis(dimethylketoximo)silane, methylbis(cyclohexylketoximo)silane, triethoxy(ethylmethylketoxime)silane, diethoxydi(ethylmethylketoxime)silane, ethoxytri(ethylmethylketoxime)silane, methylvinylbis(methylisobutylketoximo)silane, or a combination thereof.

Alternatively, ingredient (D) may be polymeric. For example, ingredient (D) may comprise a disilane such as bis(triethoxysilyl)hexane), 1,4-bis[trimethoxysilyl(ethyl)]benzene, and/or bis[3-(triethoxysilyl)propyl]tetrasulfide.

Ingredient (D) can be one single crosslinker or a combination comprising two or more crosslinkers that differ in at least one of the following properties: hydrolyzable substituents and other organic groups bonded to silicon, and when a polymeric crosslinker is used, siloxane units, structure, molecular weight, and sequence.

Ingredient (E), the moisture curable polyorganosiloxane, is optional and includes any moisture curable polyorganosiloxane. Ingredient (E) comprises a polymer backbone having an average, per molecule, of one or more hydrolyzable substituents covalently bonded thereto. Alternatively, the one or more hydrolyzable substituents are hydrolyzable silyl substituents. The polymer backbone may be selected from a polyorganosiloxane such as a polydiorganosiloxane, an organic polymer backbone, or a silicone-organic copolymer backbone (having the one or more hydrolyzable silyl substituents covalently bonded to an atom in the polymer backbone). Alternatively, the polymer backbone of ingredient (E) may be a polyorganosiloxane backbone, or an organic backbone. Alternatively, the polymer backbone of ingredient (E) may be a polyorganosiloxane backbone. The hydrolyzable substituents are exemplified by halogen atoms; carboxamido groups such as acetamido groups, benzamido groups, or methylacetamido groups; acyloxy groups such as acetoxy groups; hydrocarbonoxy groups such as alkoxy groups or alkenyloxy groups; amino groups; aminoxy groups; hydroxyl groups; mercapto groups; oximo groups; ketoximo groups; alkoxysilylhydrocarbylene groups; or any 2+ combination thereof. Alternatively, ingredient (E) may have an average of two or more hydrolyzable substituents per molecule. The hydrolyzable substituent in ingredient (E) may be located at terminal, pendant, or both terminal and pendant positions on the polymer backbone. Alternatively, the hydrolyzable substituent in ingredient (E) may be located at one or more terminal positions on the polymer backbone. Ingredient (E) may comprise a linear, branched, cyclic, or resinous structure. Alternatively, ingredient (E) may comprise a linear, branched or cyclic structure. Alternatively, ingredient (E) may comprise a linear or branched structure. Alternatively, ingredient (E) may comprise a linear structure. Alternatively, ingredient (E) may comprise a linear structure and a resinous structure. Ingredient (E) may comprise a homopolymer or a copolymer or a combination thereof. When present, the amount of ingredient (E) may be from >0 to 70 wt %, alternatively within this range <40 wt %, alternatively <10 wt %.

Ingredient (F), the vehicle, is optional and may be, e.g., a solvent and/or diluent. Vehicle may facilitate flow of the composition and introduction of certain ingredients, such as silicone resin. Suitable vehicles include polyorganosiloxanes with suitable vapor pressures, such as hexamethyldisiloxane, octamethyltrisiloxane (e.g., OS-20 silicone fluid, Dow Corning Corporation), hexamethylcyclotrisiloxane, and other low molecular weight polyorganosiloxanes, such as 0.5 to 1.5 $cm^2/s$ Dow Corning® 200 Fluids and DOW CORNING® OS FLUIDS. Alternatively, the vehicle may be an organic solvent. The organic solvent can be an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride; chloroform; dimethyl sulfoxide; dimethyl formamide, acetonitrile; tetrahydrofuran; white spirits; mineral spirits; naphtha; n-methyl pyrrolidone; or a combination thereof. The amount of vehicle can depend on various factors including the type of vehicle selected and the amount and type of other ingredients selected for the composition. However when present, the amount of vehicle may range from 1 to 50 wt %, alternatively from 5 to 40 wt % of the composition.

Ingredient (G), surface modifier, is optional and may be the (g1) adhesion promoter or (g2) release agent, or a combination thereof and may be added to the composition before or simultaneously with adding the cure catalyst (ingredient (C)) thereto.

The ingredient (g1), adhesion promoter, when present, may be in an amount ranging from 0.01 to 5 weight wt %, alternatively 0.1 to 4 wt %, alternatively 0.40 to 3 wt %, alternatively any 2+ combination thereof. Suitable adhesion promoters may comprise a transition metal chelate, a hydrocarbonoxysilane such as an alkoxysilane, a combination of an alkoxysilane and a hydroxy-functional polydiorganosiloxane, an aminofunctional silane, an unsaturated or epoxy-functional compound, an unsaturated or epoxy-functional alkoxysilane, or a combination thereof. Suitable transition metal chelates may be titanates, zirconates such as zirconium acetylacetonate, aluminum chelates such as aluminum acetylacetonate, and any 2+ combination thereof. Suitable epoxyfunctional alkoxysilanes may be 3-glycidoxypropyltrimethoxysilane, 3-glycidoxypropyltriethoxysilane, (epoxycyclohexyl)ethyldimethoxysilane, (epoxycyclohexyl)ethyldiethoxysilane and any 2+ combination thereof. Suitable unsaturated alkoxysilanes may be vinyl trimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and any 2+ combination thereof. The adhesion promoter may be the aminofunctional silane. Suitable aminofunctional silanes may be $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_3SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3$ (OCH$_3$)$_2$, CH$_3$NH(CH$_2$)$_5$SiCH$_3$(OCH$_2$CH$_3$)$_2$, H$_2$N(CH$_2$)$_2$NH(CH$_2$)$_3$SiCH$_3$(OCH$_3$)$_2$, H$_2$N(CH$_2$)$_2$NH(CH$_2$)$_3$SiCH$_3$(OCH$_2$CH$_3$)$_2$, CH$_3$NH(CH$_2$)$_2$NH(CH$_2$)$_3$SiCH$_3$(OCH$_3$)$_2$, CH$_3$NH(CH$_2$)$_2$NH(CH$_2$)$_3$SiCH$_3$(OCH$_2$CH$_3$)$_2$, C$_4$H$_9$NH(CH$_2$)$_2$NH(CH$_2$)$_3$SiCH$_3$(OCH$_3$)$_2$, C$_4$H$_9$NH(CH$_2$)$_2$NH(CH$_2$)$_3$SiCH$_3$(OCH$_2$CH$_3$)$_2$, and any 2+ combination thereof. Ingredient (H) may be ethylenediaminoproplytrimethoxysilane, alternatively gamma-aminopropyltriethyoxy silane, alternatively glycidoxypropyltrimethoxy silane, alternatively a mixture of gamma-aminopropyltriethyoxy silane, glycidoxypropyltrimethoxy silane, and methyl trimethoxy silane, alternatively methacryloxypropyltrimethoxysilane.

The ingredient (g2) may be a molecule, alternatively a mixture of molecules, e.g., a phenyl-containing polyorganosiloxane, e.g., a phenyl-containing polydiorganosiloxane of formula R$^T$Si(R)$_2$-A-Si(R)$_2$R$^T$, wherein R$^T$ is a hydrocarbyl and A and R are as defined previously except at least one R is a phenyl. Ingredient (g2), when present, may be in an amount of from >0 wt % to 5 wt %, alternatively 0.5 to 3 wt % of the composition.

Ingredient (H), the optical brightener, may be any molecule or material suitable for absorbing light in the ultraviolet or violet region and re-emitting it in the blue region of the visible spectrum. Examples are stilbenes, fluorescent compounds, coumarins, imidazolines, diazoles, triazoles, and benzoxazolines. Ingredient (H), when present, may be from >0 to 3 wt %, alternatively from 0.5 to 2 wt % of the composition.

Ingredient (I), the pigment, includes any ingredient specifically used to impart color to a reaction product of the composition described herein. The amount of pigment depends on various factors including the type of pigment selected and the desired degree of coloration of the reaction product. For example, the composition may comprise 0 to 20%, alternatively 0.001% to 5%, of a pigment based on the weight of all ingredients in the composition. Examples of suitable pigments are indigo, titanium dioxide Stan-Tone 50SP01 Green (which is commercially available from PolyOne) and carbon black. Examples of suitable carbon blacks are Shawinigan Acetylene black, which is commercially available from Chevron Phillips Chemical Company LP; SUPERJET® Carbon Black (LB-1011) supplied by Elementis Pigments Inc., of Fairview Heights, Ill. U.S.A.; SR 511 supplied by Sid Richardson Carbon Co, of Akron, Ohio U.S.A.; and N330, N550, N762, N990 (from Degussa Engineered Carbons of Parsippany, N.J., U.S.A.). The pigment may be used in the composition intended, for example, for use in sealing some electronics components.

Ingredients (J) to (V). Ingredients (J) to (V) are optionally present in the composition. Examples of suitable ingredients (J) to (V) are known in the art. For example, the ingredient (K), the extender or plasticizer, may be the same as, alternatively different than, any one or combination of the aforementioned ingredient (F), the vehicle. The plasticizer may be an organic plasticizer or an organic polymer plasticizer, which lack Si. The organic plasticizer may be a carboxylic acid (e.g., acetic acid or a fatty acid), a carboxylate salt (e.g., an ammonium or Group 1 or 2 metal adipate or phthalate salt), a carboxylic acid ester (e.g., a carboxylic acid alkyl ester such as dibutyl phthalate), or a combination thereof. The organic polymer plasticizer may be a polyalkylene glycol ester (e.g., dimethylene glycol dibenzoate), a polyester (e.g., polyethylene terephthalate), or a polyalkylene glycol (e.g., a polyethylene glycol). The amount of organic plasticizer, when present maybe from >0 to 50 wt %, alternatively from 1 to 40 wt % of the composition. The ingredient (U), the rheological additive, may be any substance used to modify rheology of the composition, and may be other than ingredients (F) and (K). Examples of ingredient (U) are polyamides, Polyvest, which is commercially available from Evonik, Disparlon from King Industries, Kevlar Fibre Pulp from Du Pont, Rheospan from Nanocor, Ircogel from Lubrizol, polyamide waxes; hydrogenated castor oil derivatives; metal soaps such as calcium stearate, aluminum stearate and barium stearate, microcrystalline waxes, and any combination thereof. The amount of ingredient (U), when present, may be from >0 to 20 wt %, alternatively from 1 to 5 wt % of the composition. Aluminum trihydrate may be used as a flame retardant (ingredient (O)) for imparting flame resistance to the composition, as for use in Li ion battery applications. Calcium carbonate may be used as an extender (ingredient (K)) for lowering the cost of the composition. Examples of ingredient (W), the corrosion inhibitor, are benzotriazole, mercaptobenzotriazole, mercaptobenzothiazole, and R.T. Vanderbilt's 2,5-dimercapto-1,3,4-thiadiazole derivative (CUVAN 826), alkylthiadiazole (CUVAN 484). The amount of corrosion inhibitor may be from 0.05 to 2 wt % based on total weight of the composition.

The SCP MB is contacted and mixed with ingredient (C) and ingredient (D) sequentially or simultaneously. Any additional ingredients (E) to (V) may be similarly contacted with the SCP MB, before or after ingredients (C) and (D). Different steps (e.g., treating and converting) of the method may proceed for similar or different periods of time, which may depend on e.g. reaction time, temperature or mixing efficiency, and similar or different reaction temperatures, which may depend on e.g. reaction time or mixing efficiency. Each mixing time independently may be from 1 minute to 60 minutes and each reaction temperature independently may be from 10° C. to 50° C. (e.g., 25° C.). The mixing of at least ingredients (a1) and (a2) may be performed under high shear mixing conditions with a high shear mixer (e.g., mixing with a Z-blade mixer), e.g., at sufficient rpm so as to achieve the objective of the method. An initial SCP MB may be rapidly formed, but may lack flowability characteristic (a). Upon continued mixing, however, a minimum treating effective time is eventually reached when the SCP MB is produced with at least characteristic (a). The continued mixing may be stopped when visual inspection shows the SCP MB has a desired flowability, as determined by periodically sampling the mixture of ingredients (A) and (B), and determining dynamic viscosity thereof. With additional mixing past the minimum treating effective time, the characteristic (a) may continue to improve until plateauing at a maximum value under the circumstances.

Typically mechanics of the method comprises contacting and mixing ingredients with equipment suitable for the mixing. The equipment is not specifically restricted and may be, e.g., agitated batch kettles for relatively high flowability (low dynamic viscosity) compositions, a ribbon blender, solution blender, co-kneader, twin-rotor mixer, Banbury-type mixer, or extruder. The method may employ continuous compounding equipment, e.g., extruders such as extruders, twin screw extruders (e.g., Baker Perkins sigma blade mixer or high shear Turello mixer), may be used for preparing compositions containing relatively high amounts of particulates. The composition may be prepared in batch, semi-batch, semi-continuous, or continuous process. General methods are known, e.g., US 2009/0291238; US 2008/0300358.

The composition may be prepared as a one part or multiple part composition. The one-part composition may be prepared by combining all ingredients by any convenient means, such as mixing, e.g., as described for the method. All mixing steps or just a final mixing step may be performed under substantially anhydrous conditions, and the resulting composition may be stored under substantially anhydrous conditions, e.g., in a sealed container, under anhydrous atmosphere, or both, until ready for use. The multiple part (e.g., 2 part) composition may be prepared from the SCP MB, wherein the SCP MB and the cure catalyst ingredient (C) are stored in separate parts, and the parts are combined (e.g., by mixing) shortly before use of the composition. The SCP MB part and a cure catalyst part may be combined in relative amounts of from 1:1 to 10:1. The composition may comprise a moisture cure package. The crosslinker ingredient (D) may be stored in a crosslinker part or in the SCP MB part.

Once prepared the composition may be used immediately or stored for any practical period, e.g., ≥1 hour, alternatively ≥1 day, alternatively ≥1 week, alternatively ≥30 days, alternatively ≥300 days, alternatively ≥2 years before use. The composition may be stored in a container that protects the composition from exposure to a cure trigger (e.g., triggering agent, e.g., water or lower alcohol) or triggering condition (e.g., heat, with or without water release agent). The storage may be at a suitable temperature (e.g., ≤40° C., e.g., 25° C.) and under an inert gas atmosphere (e.g., $N_2$ or Ar gas), or both) Under such storage, the composition continues to meet the flowability characteristic (a).

Then, when desired, curing (via the condensation reaction) of the composition may be initiated by exposing it to the cure trigger to give the cured material. For example, the cured material may be prepared by contacting the composition with an effective amount of a triggering agent (e.g., quantity of water, methanol, or ethanol), triggering effective condition (e.g., heat), or both so as to initiate a condensation reaction, which is catalyzed by the cure catalyst ingredient (C). Exposure to ambient moisture may provide the triggering amount of water. The curing of the composition to a tack-free surface may occur at 25° C. in less than 2 hours, alternatively less than 1 hour, alternatively less than 20 minutes, alternatively less than 10 minutes, alternatively less than 5 minutes. If desired, curing may be performed at higher or lower temperatures for shorter or longer periods of time. Upon curing, the resulting cured material may form a gum, gel, rubber, or resin.

The composition and cured material are useful as the adhesive, alternatively the coating, alternatively the filler, alternatively the sealant. The composition and cured material may be readily incorporated onto or into the substrate of the manufactured article. The substrate may be wood, vinyl, fiberglass, aluminum, or glass. The manufactured article may be a building component (e.g., a window or door assembly), automotive, or electronic component. The article may be manufactured by filling a cavity in the substrate with the composition, or by applying the composition to at least an exterior or interior surface portion of the substrate by any suitable means such as by brushing, calendaring, dipping, drawing down, (co)extruding, rolling, spraying, or wiping, to give the article having the composition applied therein or thereon. If desired, the applied composition may then be cured in or on the substrate so as to make the manufactured article having the cured material.

The composition and cured material prepared therefrom advantageously may have an advantageous combination of properties that make them especially useful for sealing electronic components of electronic devices. The composition has the flowability characteristic (a) that enables extrusion at a temperature (e.g., at 25° C.) that is not too high for uniform sealing of temperature sensitive electronic components without overruns. And yet the flowability is not too much so as to give a brittle cured material. Further, once cured, the resulting cure material has a difficult to achieve combination of toughness (e.g., characteristic (b), (c), (e), or any 2+ combination thereof). The composition, before and during curing, and at least in some aspects the cured material, hereinafter repairable materials, may also be characterizable by its repairability, which is desired in the electronics industry. Repairability generally is where the repairable material adheres to the substrate, or another layer of the cured material, where the degree of adherence is less than cohesive strength of the repairable material. That is, the degree of adherence would not prevent the repairable material from being cleanly separated or delaminated from the substrate or other layer of cured material, i.e. it can be delaminated without significant amount of cohesive separation of the repairable material. Repairability is desirable in circumstances where, for whatever reason, the electronic component of an electronic device (sub)assembly is incompletely sealed or overly coated by the cured material, which then must be peeled off of the electronic device (sub) assembly so that the electronic component can be resealed therein, thereby allowing reuse, and avoiding ruining, of the electronic device (sub)assemblies, which are expensive.

The invention is further illustrated by, and each composition/method may be any combinations of features and limitations of, the non-limiting examples that follow. In the examples, all silicone materials, hexamethyldisilazane, SiH compound, and Pt catalyst were obtained from Dow Corning Corporation unless otherwise noted. The CAB-O-SIL silicas were obtained from Cabot Corporation of Massachusetts, U.S.A. The concentrations of ingredients in the compositions/formulations of the examples are determined from the weights of ingredients added.

Preparation (Prep.) (A): general preparation of LSR MB: prepared by high shear mixing with a Z-blade high shear mixer, water, an AE Polymer having a dynamic viscosity of 100 mPa·s to 100,000 mPa·s (as ingredient (b1)), a treating agent (as ingredient (a2)), and an untreated silica (as ingredient (a1)) at 25° C. until uniformly blended, then heating the blend under a vacuum of from −0.01 to −0.1 megaPascals (MPa) at a temperature of from 120° C. to 200° C. and stripping of volatiles for from 30 minutes to 3 hours, and cooling the residual material to 25° C. to give the LSR MB.

Prep. (A1): preparation of LSR MB-1: replicate Prep. (A) wherein (b1) is dimethylvinyl-endblocked polydimethylsiloxane having a dynamic viscosity of 0.42 Pa·s at 25° C., (a2) is hexamethyldisilazane, and (a1) is CAB-O-SIL S-17D silica having a surface area of 300 $m^2/g$ to give LSR MB-1, wherein 68 wt % ingredient (b1) and 32 wt % in situ-prepared treated silica (as reaction products of (a1)+(a2)). LSR MB-1 had a dynamic viscosity of 120 Pa·s, shear rate 10.0 Hertz (Hz) as measured on a CARRIMED Viscometer (Carri-med Ltd, Dorking, Surrey, UK).

Prep. (A2): preparation of LSR MB-2: replicate Prep. (A) wherein (b1) is dimethylvinyl-endblocked polydimethylsiloxane having a dynamic viscosity of 55 Pa·s at 25° C., (a2) is hexamethyldisilazane, and (a1) is CAB-O-SIL MS-75D silica having a surface area of 200 $m^2/g$ to give LSR MB-2, wherein 67 wt % ingredient (b1) and 33 wt % in situ-prepared treated silica (as reaction products of (a1)+(a2)). LSR MB-2 had a dynamic viscosity of 900 Pa·s, shear rate 10.0 Hz as measured on the CARRIMED Viscometer.

Prep. (B): general preparation of SCP MB: prepared by mixing LSR-MB (Prep. (A)), SiH containing siloxane, and hydrosilation catalyst at 80° C. for from 30 minutes to 3 hours to give SCP MB. Used to prepare Prep. (B1) and (B2).

Prep. (B1): preparation of SCP MB-1: mixed 300 grams ("g") of LSR MB-1 (Prep. A1), 900 g of the dimethylvinyl-endblocked polydimethylsiloxane with a dynamic viscosity of 0.42 Pa·s, 39.4 g $(CH_3O)_3SiCH_2CH_2Si(CH_3)_2OSi(CH_3)_2H$, and 5.63 milligrams (mg) 1,3-Diethenyl-1,1,3, 3-Tetramethyldisiloxane Platinum Complex, and heated resulting mixture to 80° C. for 1 hour, cooled to 25° C. to give SCP MB-1.

Prep. (B2): preparation of SCP MB-2: mixed 600 g of LSR MB-1 (Prep. A1), 600 g dimethylvinyl-endblocked polydimethylsiloxane with a dynamic viscosity of 0.42 Pa·s, 35.96 g $(CH_3O)_3SiCH_2CH_2Si(CH_3)_2OSi(CH_3)_2H$, and 5.13 mg 1,3-Diethenyl-1,1,3,3-Tetramethyldisiloxane Platinum Complex, heated resulting mixture to 80° C. for 1 hour, and cooled to 25° C. to give SCP MB-2.

Example (Ex.) 1

Preparation of Composition (1)

Composition (1) was prepared under anhydrous conditions and contained a uniform mixture of 97 wt % of SCP MB-1 (Prep. (B1)), 1.5 wt % of methyltrimethoxysilane, and 1.5 wt % of titanium diisopropoxybis(ethylacetoacetate) to produce composition (1) as a room-temperature curable organopolysiloxane composition having 8 wt % treated silica content.

Ex. 2

Preparation of Composition (2)

Composition (2) was prepared under anhydrous atmosphere and contained a uniform mixture of 97 wt % of SCP MB-2 (Prep. (B2)), 1.5 wt % of methyltrimethoxysilane, and 1.5 wt % of titanium diisopropoxybis(ethylacetoacetate) to produce composition (2) as a room-temperature curable organopolysiloxane composition having 16 wt % treated silica content.

Ex. 3 to 5

Preparations of Compositions (3) to (5)

Compositions (3) to (5) were prepared by the same method as in Example 1 except the relative amounts of LSR MB-1 were separately adjusted to produce compositions (3), (4), and (5) as room-temperature curable organopolysiloxane compositions having 24 wt %, 28 wt %, and 32 wt % treated silica content, respectively.

Ex. 6 to 10

Prophetic

Replicate Ex. 1 to 5 except use LSR MB-2 (Prep. (A2)) instead of LSR MB-1 to give the compositions of Ex. 6 to 10, respectively.

Comparative Example (CEx.) 1

Preparation of Formulation (a)

Mixed 736 g of a (trimethoxysilylethylene)-endblocked polydimethylsiloxane with a dynamic viscosity of 0.50 Pa·s, 64 g RDX200 fumed silica (pretreated with hexamethyldisilazane), heated resulting mixture to 100° C. under a vacuum (−0.08 megaPascals (MPa)) for 1 hour, cooled to 25° C. to give a base material. Formulation (a) was prepared under anhydrous atmosphere and contained a uniform mixture of 97 wt % of the base material, 1.5 wt % of methyltrimethoxysilane, and 1.5 wt % of titanium diisopropoxybis(ethylacetoacetate) to produce formulation (a) as a room-temperature curable organopolysiloxane formulation.

CEx. 2

Preparation of Formulation (b)

Mixed 672 g of (trimethoxysilylethylene)-endblocked polydimethylsiloxane with a dynamic viscosity of 0.50 Pa·s, 128 g RDX200 fumed silica (pretreated with hexamethyldisilazane), heated resulting mixture to 100° C. under a vacuum (−0.08 megaPascals (MPa)) for 1 hour, cooled to 25° C. to give a base material. Formulation (b) was prepared under anhydrous atmosphere and contained a uniform mixture of 97 wt % of the base material, 1.5 wt % of methyltrimethoxysilane, and 1.5 wt % of titanium diisopropoxybis (ethylacetoacetate) to produce formulation (b) as a room-temperature curable organopolysiloxane formulation.

Determined properties of compositions (1) to (5) of Ex. 1-5 and formulations (a), and (b) of CEx. 1-2, including dynamic viscosity, tack-free-time (TFT), hardness, tensile strength and elongation according to the methods described previously. Results are shown in Table 1.

TABLE 1

| Properties | Examples | | | | | Comparative Examples | |
|---|---|---|---|---|---|---|---|
| | Ex. 1 | Ex. 2 | Ex. 3 | Ex. 4 | Ex. 5 | CEx. 1 | CEx. 2 |
| Silica content (wt %) | 8 | 16 | 24 | 28 | 32 | 8 | 16 |
| Dynamic Viscosity (mPa·s & cP) | 780 | 1400 | 3800 | 6100 | 30000 | 6400 | 41000 |
| TFT (min) | 8 | 5.83 | 4.42 | 4.25 | 4 | 7 | 5.42 |
| Hardness (Shore A) | 25 | 27 | 32 | 34 | 36 | 31 | 38 |
| Tensile strength (psi (Kpa)) | N/t | 120.2 (829) | 390.0 (2690) | 436.5 (3010) | 474.7 (3270) | 92.1 (635) | 230.4 (1590) |
| Elongation (%) | N/t | 127 | 134 | 152 | 160 | 92 | 148 |

In Table 1, N/t means not tested; 1 mPa·s = 1 centipoise (cP); 100 psi (pound per square inch) = 689 kilopascals (Kpa).

Figure 2:
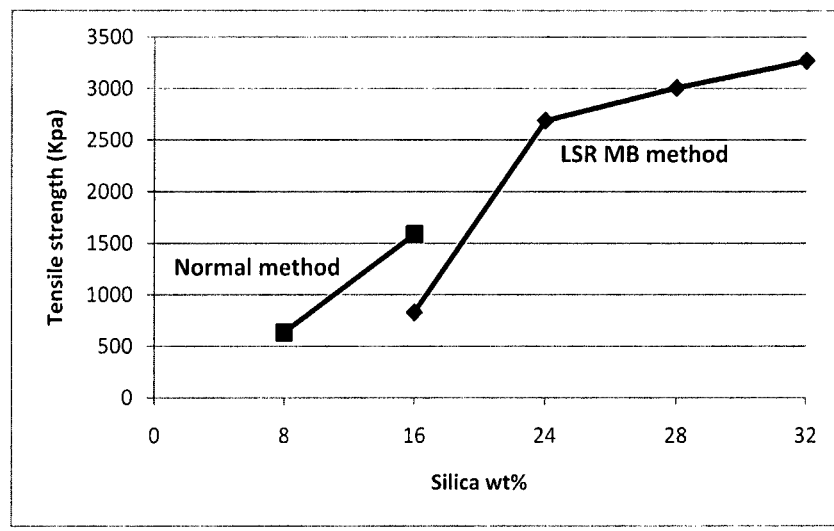
FIG. 2 graphically depicts change in tensile strength (T.S.) versus wt % silica content for the compositions of the Examples prepared using the present "LSR MB method" and for the formulations of the Comparative Examples prepared using the "Normal method."

FIGS. 1 and 2 provide complementary ways of showing some of the advantages of the invention. FIG. 1 graphically depicts change in dynamic viscosity (cP) versus wt % silica content for the compositions of the Examples prepared using the invention "LSR MB method" and for the formulations of the Comparative Examples prepared using the "Normal method." Unpredictably, the dynamic viscosity of the Examples is substantially lower than the dynamic viscosity of the formulations of the Comparative Examples at the same wt % loading of silica.

FIG. 2 graphically depicts change in tensile strength (pounds per square inch, psi) versus wt % silica content for the compositions of the Examples prepared using the present "LSR MB method" and for the formulations of the Comparative Examples prepared using the "Normal method." Unpredictably, the wt % silica loading for the compositions of the Examples is substantially higher than the wt % silica loading of the formulations of the Comparative Examples at the same dynamic viscosity.

The Examples and data in Table 1 and FIG. 1-2 show that the invention provides the alternative silica filled silicone composition and method of making same that may unpredictably achieve a relatively lower ratio of dynamic viscosity to concentration of treated silica at ambient temperature (e.g., 25° C.) (e.g., Ex. 1 and 2 respectively compared to non-invention CEx. 1 and 2). The composition is useful, inter alia, as the adhesive, coating or sealant and may be cured to give the cured material and/or manufactured article.

The invention claimed is:

1. A filled silicone composition comprising a mixture of:
   (A) an in situ-prepared treated silica;
   (B) an in situ-prepared (siloxane-alkylene)-endblocked polydiorganosiloxane ("SAE Polymer");
   (C) a catalytically effective amount of a cure catalyst; and
   (D) a crosslinking effective amount of a crosslinker;
   wherein the composition is prepared by:
   treating an untreated silica with a treating effective amount of a treating agent in presence of an alkenyl-endblocked polydiorganosiloxane ("AE Polymer") so as to produce a liquid silicone rubber master batch ("LSR MB") comprising a mixture of the treated silica and the AE Polymer;
   converting the AE Polymer in the LSR MB with a converting effective amount of a SiH containing siloxane and a catalytically effective amount of a hydrosilation catalyst so as to produce a SiH converted polymer master batch ("SCP MB") comprising a mixture of the treated silica and the SAE Polymer; and
   mixing the SCP MB with sufficient amounts of the cure catalyst and the crosslinker so as to produce the composition, and
   wherein the AE Polymer is an alkenyl-endcapped polydimethylsiloxane of formula (VE1):

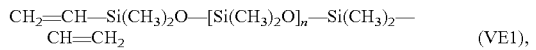
(VE1), wherein n is an average number of from 100 to 1000, and a dynamic viscosity of from 100 to 100,000 milliPascal-seconds (mPa·s) when tested as described in ASTM D1084; the untreated silica has a surface area of from 200 to 400 square meters per gram (m²/g) and is from greater than 0 wt % to 35 wt % based on total weight of the composition; the weight/weight ratio of AE Polymer to untreated silica is from 60:40 to 90:10; and the SiH containing siloxane is of formula (SH1):

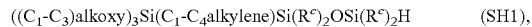
(SH1), wherein each $R^c$ independently is $(C_1-C_3)$alkyl.

2. The composition as in claim 1, wherein (A) and (B) together are from 25 to 99.7 wt %, the cure catalyst is from 0.1 to 5 wt %, and the crosslinker is from 0.2 to 10 wt %, all based on total weight of the composition.

3. The composition in claim 2, wherein (A) and (B) together are from 25 to 97 wt %, alternatively from 25 to 90 wt %, alternatively from 25 to 85 wt %, alternatively from 31 to 85 wt %, alternatively from 25 to 79 wt %, each based on total weight of the composition.

4. The composition in claim 3, wherein:
   i) the crosslinker is 0.5 to 5 wt % based on the weight of (B);
   ii) the cure catalyst is in the range from 0.1 to 5 wt % a minimum greater than or equal to 0.20 wt %, alternatively greater than or equal to 0.30 wt %, alternatively greater than or equal to 0.50 wt %; and/or alternatively in the range from 0.1 to 5 wt % a maximum less than or equal to 4 wt %, alternatively less than or equal to 3 wt %, alternatively less than or equal to 2 wt %, alternatively less than or equal to 1 wt %, each based on total weight of the composition; or
   iii) both i) and ii).

5. The composition as in claim 1, wherein n is 160, from 300 to 400, from 600 to 800, or from 800 to 1000; and the SiH containing siloxane is $(CH_3O)_3SiCH_2CH_2Si(CH_3)_2OSi(CH_3)_2H$.

6. The composition as in claim 1, wherein the composition has:
   (a) a ratio of dynamic viscosity to concentration of treated silica of from greater than 0 to less than or equal to 200 centiPoise per weight percent (cP/wt %) for treated silica concentrations of from greater than 0 wt % to 10 wt %, less than or equal to 500 cP/wt % for treated silica concentrations of from greater than 10 wt % to 20 wt %, less than or equal to 1,000 cP/wt % for treated silica concentrations of from greater than 20 wt % to 25 wt %, and less than or equal to 4,000 cP/wt % for treated silica concentrations of from greater than 25 to 30 wt %, and less than or equal to 5,000 cP/wt % for treated silica concentrations of from greater than 30 to 35 wt %; wherein the treated silica concentrations are based on total weight of the composition and dynamic viscosity is tested as described in ASTM D3236-88(2009);
   (b) when cured, a hardness of greater than 20, greater than 24, greater than 26, greater than 30, or greater than 35 Shore A, all when tested according to ASTM D2240-05 (2010);
   (c) when cured, a tensile strength of greater than 100 pounds per square inch (psi), greater than 250 psi, greater than 300 psi, greater than 380 psi, greater than 430 psi, or greater than 450 psi, all when tested according to ASTM D412-06ae2;
   (d) when cured, a tack-free time of less than 15 minutes, less than 9 minutes, less than 8 minutes, less than 6 minutes, or less than 5 minutes, all when tested according to ASTM D2377-00(2008);
   (e) when cured, an elongation at break of greater than 125%, greater than 130%, greater than 150%, or greater than 155%, all when tested according to ASTM D412-06ae2;
   (f) a concentration of treated silica of greater than 0 to 10 wt %, from 10 wt % to 20 wt %, from 20 wt % to 25 wt %, from 25 to 30 wt %, or from 30 to 35 wt %, wherein the treated silica concentrations are based on total weight of the composition; or (g) any combination of at least two of (a) to (f).

7. The composition as in claim 1, further comprising at least one of:
   (E) a moisture curable diorganosiloxane polymer;
   (F) a vehicle;
   (G) a phenyl-containing polyorganosiloxane;
   (H) an adhesion promoter;
   (I) a pigment; and
   (W) a corrosion inhibitor.

8. A cured material prepared by curing the composition of claim 1.

9. A manufactured article comprising a substrate and the cured material of claim 8 in operative contact with said substrate.

10. A manufactured article comprising a substrate and the composition of claim 1 in operative contact with said substrate.

11. The composition as in claim 1, wherein (A) and (B) together are from 25 to 99.7 wt %, the cure catalyst is from 0.1 to 5 wt %, and the crosslinker is from 0.2 to 10 wt %, all based on total weight of the composition.

12. The composition in claim 11, wherein (A) and (B) together are from 25 to 97 wt %, alternatively from 25 to 90 wt %, alternatively from 25 to 85 wt %, alternatively from 31 to 85 wt %, alternatively from 25 to 79 wt %, based on total weight of the composition.

13. The composition in claim 12, wherein:
   i) the crosslinker is 0.5 to 5 wt % based on the weight of (B);
   ii) the cure catalyst is in the range from 0.1 to 5 wt % a minimum greater than or equal to 0.20 wt %, alternatively greater than or equal to 0.30 wt %, alternatively greater than or equal to 0.50 wt %; and/or alternatively in the range from 0.1 to 5 wt % a maximum less than or equal to 4 wt %, alternatively less than or equal to 3 wt %, alternatively less than or equal to 2 wt %, alternatively less than or equal to 1 wt %, each based on total weight of the composition; or
   iii) both i) and ii).

14. A method of producing filled silicone composition comprising a mixture of:
   (A) an in situ-prepared treated silica;
   (B) an in situ-prepared (siloxane-alkylene)-endblocked polydiorganosiloxane ("SAE Polymer");
   (C) a catalytically effective amount of a cure catalyst; and
   (D) a crosslinking effective amount of a crosslinker, said method comprising the steps of:
   treating an untreated silica with a treating effective amount of a treating agent in presence of an alkenyl-endblocked polydiorganosiloxane ("AE Polymer") so as to produce a liquid silicone rubber master batch ("LSR MB") comprising a mixture of the treated silica and the AE Polymer;
   converting the AE Polymer in the LSR MB with a converting effective amount of a SiH containing siloxane and a catalytically effective amount of a hydrosilation catalyst so as to produce a SiH converted polymer master batch ("SCP MB") comprising a mixture of the treated silica and the SAE Polymer; and
   mixing the SCP MB with sufficient amounts of the cure catalyst and the crosslinker so as to produce the composition,
   wherein the AE Polymer is an alkenyl-endcapped polydimethylsiloxane of formula (VE1):

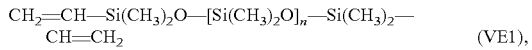

(VE1), wherein n is an average number of from 100 to 1000, and a dynamic viscosity of from 100 to 100,000 milliPascal-seconds (mPa·s) when tested as described in ASTM D1084; the untreated silica has a surface area of from 200 to 400 square meters per gram (m²/g) and is from greater than 0 wt % to 35 wt % based on total weight of the composition; the weight/weight ratio of AE Polymer to untreated silica is from 60:40 to 90:10; and the SiH containing siloxane is of formula (SH1):

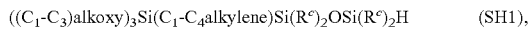

(SH1), wherein each $R^c$ independently is $(C_1-C_3)$alkyl.

15. The method as in claim 14, wherein water is utilized in the treating step.

* * * * *